US010490215B1

(12) United States Patent
Chen

(10) Patent No.: US 10,490,215 B1
(45) Date of Patent: *Nov. 26, 2019

(54) NEAR-FIELD TRANSDUCER DIELECTRIC WRAP FOR REDUCING HEAT

(71) Applicant: Seagate Technology LLC, Cupertino, CA (US)

(72) Inventor: Weibin Chen, Edina, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/054,153

(22) Filed: Aug. 3, 2018

Related U.S. Application Data

(60) Provisional application No. 62/541,261, filed on Aug. 4, 2017.

(51) Int. Cl.
| | |
|---|---|
| *G11B 11/105* | (2006.01) |
| *G11B 5/31* | (2006.01) |
| *G11B 5/48* | (2006.01) |
| *G11B 5/00* | (2006.01) |
| *G11B 11/24* | (2006.01) |
| *G11B 13/08* | (2006.01) |

(52) U.S. Cl.
CPC ............ *G11B 5/314* (2013.01); *G11B 5/4866* (2013.01); *G11B 11/24* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| 8,270,256 | B1* | 9/2012 | Juang | G11B 5/012 |
| | | | | 369/13.3 |
| 8,811,128 | B1 | 8/2014 | Seigler et al. | |
| 8,913,468 | B1* | 12/2014 | Peng | G11B 5/3136 |
| | | | | 369/13.33 |
| 9,147,427 | B1* | 9/2015 | Lee | G11B 5/3133 |
| | | | | 369/13.33 |

(Continued)

OTHER PUBLICATIONS

Chen et al., U.S. Appl. No. 16/193,351, filed Nov. 16, 2018.

(Continued)

*Primary Examiner* — Tan X Dinh
(74) *Attorney, Agent, or Firm* — Mueting, Raasch & Gebhardt, P.A.

(57) ABSTRACT

An apparatus comprises a write pole, a waveguide core, and a near-field transducer (NFT) positioned between the write pole and the waveguide core. The NFT comprises a heatsink portion, an enlarged portion, and a peg comprising a refractory metal and extending from the enlarged portion toward a media-facing surface. A first surface of the peg is substantially coplanar with a first surface of the enlarged portion and the first surface of the enlarged portion shares an interface with the heatsink portion. A first dielectric layer is positioned between the peg and the write pole, and a first adhesion layer is positioned between the peg and the first dielectric layer. In addition, a second dielectric layer is disposed on an entire surface of the NFT opposing the media-facing surface, and a second adhesion layer is positioned between the NFT and the second dielectric layer.

20 Claims, 7 Drawing Sheets

(56) References Cited

U.S. PATENT DOCUMENTS

| | | | |
|---|---|---|---|
| 9,281,003 B2 | 3/2016 | Zhao et al. | |
| 9,620,152 B2 * | 4/2017 | Kautzky | G11B 5/3109 369/13.33 |
| 9,934,801 B1 * | 4/2018 | Wessel | G11B 5/607 369/13.33 |
| 10,026,421 B1 * | 7/2018 | Barbosa Neira | G11B 5/1871 369/13.33 |
| 10,074,386 B1 * | 9/2018 | Wessel | G11B 5/3123 369/13.33 |
| 2007/0206323 A1 | 9/2007 | Im et al. | |
| 2012/0170429 A1 | 7/2012 | Zhou et al. | |
| 2012/0201108 A1 | 8/2012 | Zheng et al. | |
| 2012/0218871 A1 | 8/2012 | Balamane et al. | |
| 2013/0070576 A1 * | 3/2013 | Zou | G11B 5/3133 369/13.17 |
| 2013/0107679 A1 | 5/2013 | Huang et al. | |
| 2013/0235707 A1 | 9/2013 | Zhao et al. | |
| 2013/0265860 A1 | 10/2013 | Gage et al. | |
| 2013/0279315 A1 | 10/2013 | Zhao et al. | |
| 2013/0286802 A1 | 10/2013 | Kiely | |
| 2013/0286804 A1 | 10/2013 | Zhao et al. | |
| 2013/0322221 A1 | 12/2013 | Naniwa et al. | |
| 2014/0004384 A1 | 1/2014 | Zhao et al. | |
| 2014/0029396 A1 | 1/2014 | Rausch et al. | |
| 2014/0177407 A1 | 6/2014 | Peng et al. | |
| 2014/0254336 A1 | 9/2014 | Jandric et al. | |
| 2014/0254337 A1 | 9/2014 | Seigler et al. | |
| 2014/0254338 A1 | 9/2014 | Habermas et al. | |
| 2014/0307534 A1 * | 10/2014 | Zhou | G11B 13/08 369/13.33 |
| 2014/0374376 A1 * | 12/2014 | Jayashankar | G11B 5/314 216/22 |
| 2015/0340052 A1 | 11/2015 | Sankar et al. | |
| 2016/0133291 A1 * | 5/2016 | Chen | G11B 5/314 369/13.33 |
| 2017/0221505 A1 * | 8/2017 | Staffaroni | G11B 5/314 369/13.33 |
| 2017/0323659 A1 * | 11/2017 | Matsumoto | G11B 5/314 369/13.33 |

OTHER PUBLICATIONS

Chen et al., U.S. Appl. No. 14/920,917, filed Oct. 23, 2015.
Chen, U.S. Appl. No. 16/054,137, filed Aug. 3, 2018.
File History for U.S. Appl. No. 16/193,351.
File History for U.S. Appl. No. 16/054,137.

* cited by examiner

NEAR-FIELD TRANSDUCER DIELECTRIC WRAP FOR REDUCING HEAT

SUMMARY

Embodiments of the disclosure are directed to an apparatus comprising a write pole, a waveguide core, and a near-field transducer (NFT) positioned between the write pole and the waveguide core. The NFT comprises a heatsink portion, an enlarged portion, and a peg comprising a refractory metal and extending from the enlarged portion toward a media-facing surface. A first surface of the peg is substantially coplanar with a first surface of the enlarged portion and the first surface of the enlarged portion shares an interface with the heatsink portion. The apparatus further includes a first dielectric layer positioned between the peg and the write pole, a first adhesion layer positioned between the peg and the first dielectric layer, a second dielectric layer disposed on an entire surface of the NFT opposing the media-facing surface, and a second adhesion layer positioned between the NFT and the second dielectric layer.

Further embodiments are directed to an apparatus comprising a write pole, a waveguide core, and an NFT positioned between the write pole and the waveguide core. The NFT comprises a heatsink portion, an enlarged portion, and a peg comprising a refractory metal and extending from the enlarged portion toward a media-facing surface. A first surface of the peg is substantially coplanar with a first surface of the enlarged portion and the first surface of the enlarged portion shares an interface with the heatsink portion. A first dielectric layer is positioned between the NFT and the write pole, and a second dielectric layer is positioned between the NFT and the waveguide core, wherein at least one of the dielectric layers has a refractive index less than 1.5.

Additional embodiments are directed to an apparatus comprising a write pole, a waveguide core, and an NFT positioned between the write pole and the waveguide core. The NFT comprises a heatsink portion, an enlarged portion, and a peg comprising a refractory metal and extending from the enlarged portion toward a media-facing surface. A first surface of the peg is substantially coplanar with a first surface of the enlarged portion and the first surface of the enlarged portion shares an interface with the heatsink portion. A first dielectric layer is positioned between the peg and the write pole, and a second dielectric layer is positioned between the NFT and the waveguide core. The second dielectric layer comprises a bi-layer structure having a first dielectric material proximate the peg and a second dielectric material proximate the waveguide core.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a source of optical energy (e.g., a laser diode) is integrated with a recording head and couples optical energy to a waveguide or other light transmission path. The waveguide delivers the optical energy to a near-field transducer (NFT). The NFT concentrates the optical energy into a tiny optical spot in a recording layer of a magnetic recording medium, which raises the medium's temperature locally, reducing the writing magnetic field required for high-density recording.

Generally, the NFT is formed by depositing one or more thin-films of a plasmonic material such as gold, silver, copper, aluminum, etc., at or near an integrated optics waveguide or some other light/energy delivery system. The laser light, delivered via the waveguide, generates a surface plasmon field on the portions of the NFT exposed to the light. The NFT is shaped such that the surface plasmons are directed out of a surface of the write head onto a magnetic recording medium.

Due to the intensity of the laser light and the small size of the NFT, the NFT and surrounding material are subject to a significant rise in temperature during writing operations. Over time, this can affect integrity of the NFT, for example, causing it to become misshapen. Other events, such as contact between the read/write head and a recording medium, and/or with contamination on the recording medium, etc., may also degrade the operation of the NFT and nearby optical components. The high NFT temperatures thereby decrease the reliability of the HAMR read/write head and the effective service life of the head (i.e., the number of laser-on hours). In view of this, embodiments described herein are directed to reducing the NFT temperature by introducing and/or increasing the amount of low optical index materials proximate the NFT.

Figure 1:
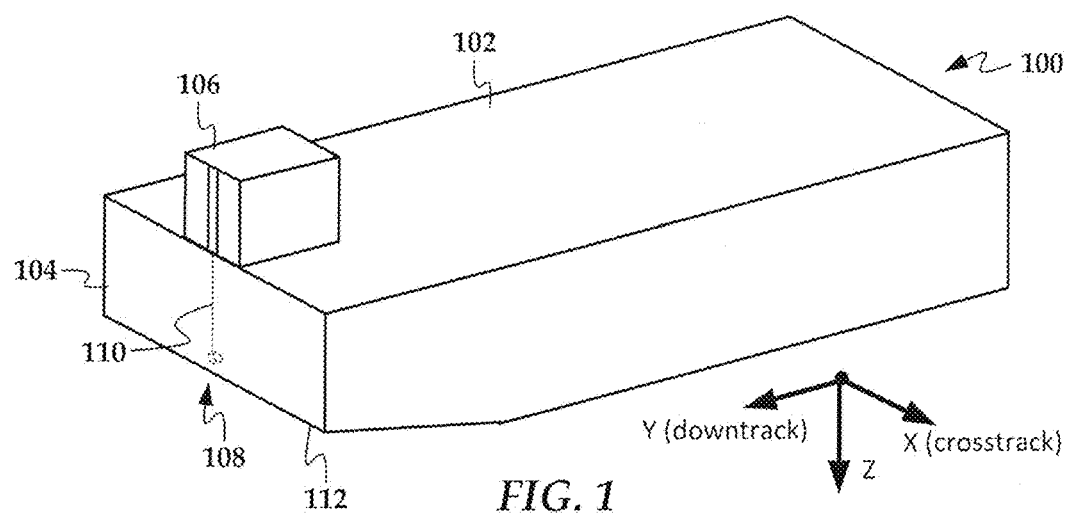
FIG. 1 is a perspective view of a HAMR slider assembly according to embodiments discussed herein.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a NFT that is part of the read/write transducers 108. The NFT achieves surface plasmon resonance and directs the energy out of a media-facing surface 112 to create a small hot spot in the recording medium.

Figure 2:
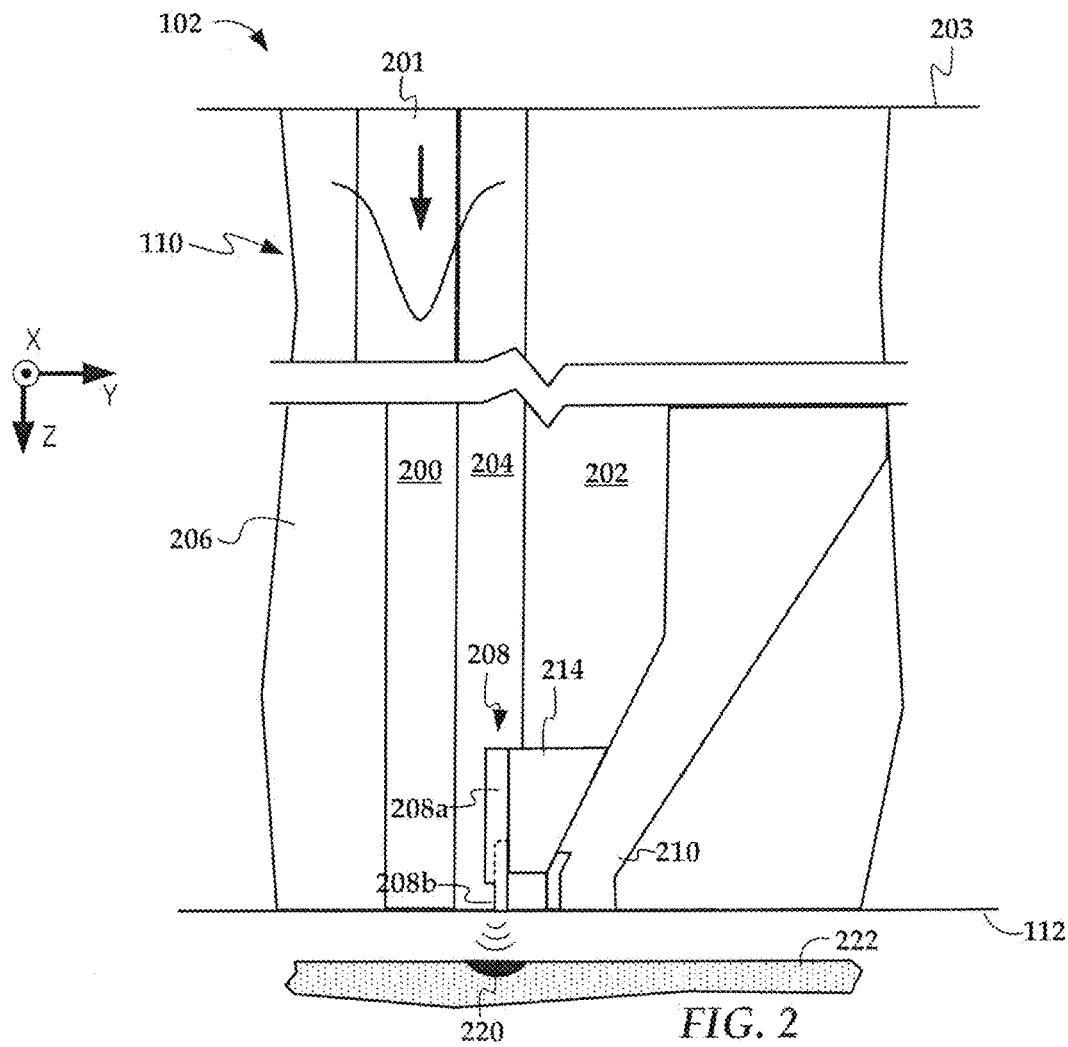
FIG. 2 is a cross-sectional view of a slider along a down-track plane, according to embodiments discussed herein.

In FIG. 2, a cross-sectional view shows details of a slider body 102 according to an example embodiment. The waveguide 110 includes a core 200, top cladding layer 202, side cladding layer 204, and bottom cladding 206. A waveguide input coupler 201 at a top surface 203 of the slider body 102 couples light from the light source 106 to the waveguide 110. The waveguide input coupler 201 receives light from the light source 106 and transfers the light to the core 200. The waveguide core 200 is made of dielectric materials of high index of refraction, for instance, AlN (aluminum nitride), $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon). The cladding layers 202, 204, 206 are each formed of a dielectric material having a refractive index lower than the core 200. The cladding can be, for instance, $Al_2O_3$ (aluminum oxide), SiO (silicon oxide), and $SiO_2$ (silica). As discussed further below, cladding layers 202 and 204 can comprise different materials, or the same materials.

The core 200 delivers light to an NFT 208 that is located within the side cladding layer 204 at the media-facing surface 112. A write pole 210 (which is a distal part of a magnetic write transducer) is located near the NFT 208. The magnetic write transducer may also include a yoke, magnetic coil, return pole, etc. (not shown). A heat sink 214 thermally couples the NFT 208 to the write pole 210. The magnetic coil induces a magnetic field through the write pole 210 in response to an applied current. During recording, an enlarged portion 208a (e.g., a rounded disk) of the NFT 208 achieves surface plasmon resonance in response to light delivered from the core 200, and the plasmons are tunneled via a peg 208b out of the media-facing surface 112. The energy delivered from the NFT 208 forms a hotspot 220 within a recording layer of a moving recording medium 222. The write pole 210 sets a magnetic orientation in the hotspot 220, thereby writing data to the recording medium.

As noted above, the NFT 208 reaches high temperatures during recording, and over time, this can cause instability. While the enlarged part 208a of the NFT 208 is generally formed from a plasmonic material such as Au (gold), Ag (silver), Cu (copper), Al (aluminum), or alloys thereof, the peg 208b may be formed from a high-melting-point material, such as a refractory metal (including Rh (rhodium), Ir (iridium), Pt (platinum), Pd (palladium), or alloys thereof, etc.), to improve peg thermal stability. In existing designs, one side of the peg 208b is in direct contact with a dielectric. Embodiments described herein have both the peg 208b and the enlarged portion 208a wrapped in a low optical index (e.g., less than 1.5) dielectric material. The low index dielectric reduces NFT absorption resulting in reduced NFT operating temperatures.

Figure 3A:
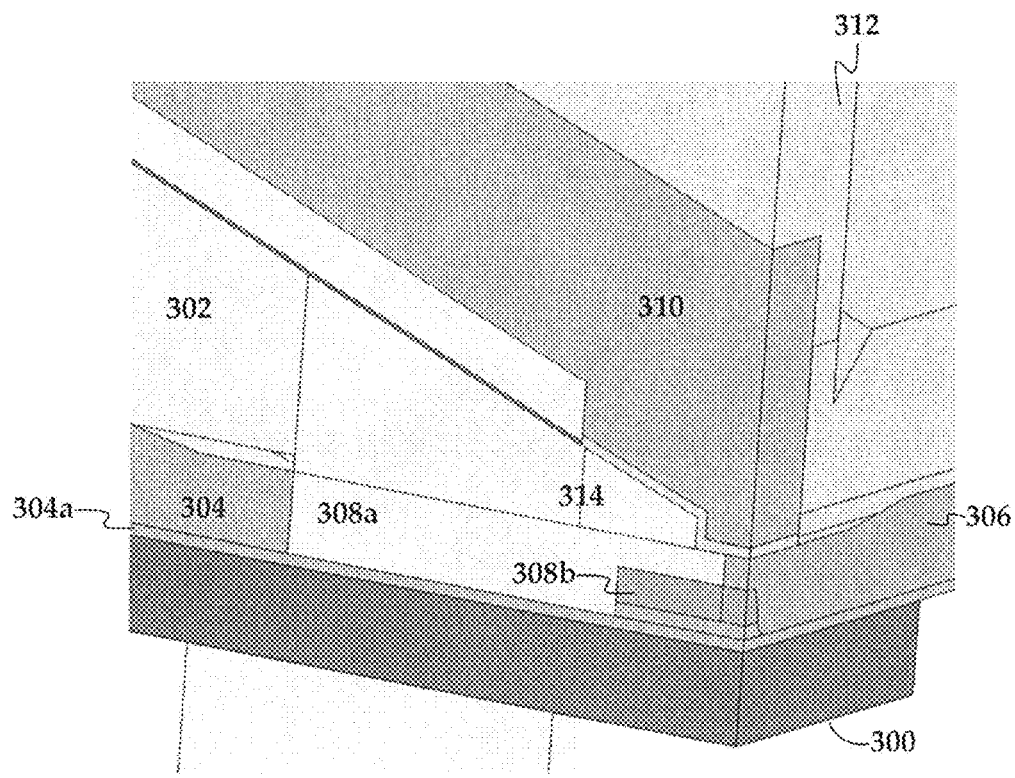
FIG. 3A is a partial perspective view of a baseline near-field transducer configuration according to embodiments discussed herein.

FIGS. 3A-D illustrate perspective cross-sectional views of a HAMR slider having different configurations of low index dielectric material. In FIG. 3A, a baseline configuration is shown where an NFT is positioned between a write pole 310 and a waveguide core 300. The NFT comprises an enlarged portion 308a, a peg 308b, and a heatsink 314. The peg 308b extends from the enlarged portion 308a toward the media-facing, or air-bearing, surface (ABS) 312. Portions of the waveguide cladding are shown proximate an NFT surface opposite the ABS, including a top cladding layer 302 and a side cladding layer 304. The side cladding layer includes a layer 304a that is disposed between the NFT and the waveguide core 300, and the layer 304a can be referred to as the core to NFT spacing (CNS) layer. The CNS layer can be about 10 to 60 nm, about 15 to 30 nm, or about 15-25 nm. Also, the layer 306 located between the peg 308b and the write pole 310 is referred to herein as the NFT to pole spacing (NPS) layer. While the NFT is generally surrounded by dielectric material, the respective refractive indices of those materials in combination with the NFT materials affect the temperature of the NFT.

The NFTs discussed herein have a peg and enlarged portion (e.g., disk) configuration, where the enlarged portion 308a and heatsink 314 are comprised of a relatively soft plasmonic material (e.g., Au, Ag, Cu, Al, and alloys thereof). However, the NFT can have any variety of configurations including gap type and peg only NFTs. In each of the configurations, the peg 308b is comprised of a refractory metal (e.g., Rh, Ir, Pd, Pt, and alloys thereof). Since a refractory metal has a higher melting point than a soft plasmonic material, an NFT with a refractory metal peg can operate at higher temperatures than an NFT with a soft plasmonic peg. A refractory metal is also a useful peg material since it is hard and resistant to corrosion. In certain embodiments, the enlarged portion 308a comprises gold, and the peg 308b comprises rhodium.

In the baseline configuration of FIG. 3A, the NFT is largely surrounded, or wrapped, in alumina. The side cladding 304, CNS layer 304a, and the NPS layer 306 are all alumina ($Al_2O_3$) while the top cladding 302 is silica ($SiO_2$). A dielectric with a refractive index of less than 1.5 can reduce the temperature of the NFT. While alumina has an optical refractive index of 1.7682, silica has a refractive index of 1.4585. The lower optical index dielectric (e.g., an index of less than 1.5) causes surface plasmon polaritons to have longer oscillation length into the surrounding medium (e.g., dielectric). This improves the NFT efficiency by requiring less laser current for HAMR writing. The reduced current, correlates to reduced NFT temperature and increased life and reliability for the head.

Figure 3B:
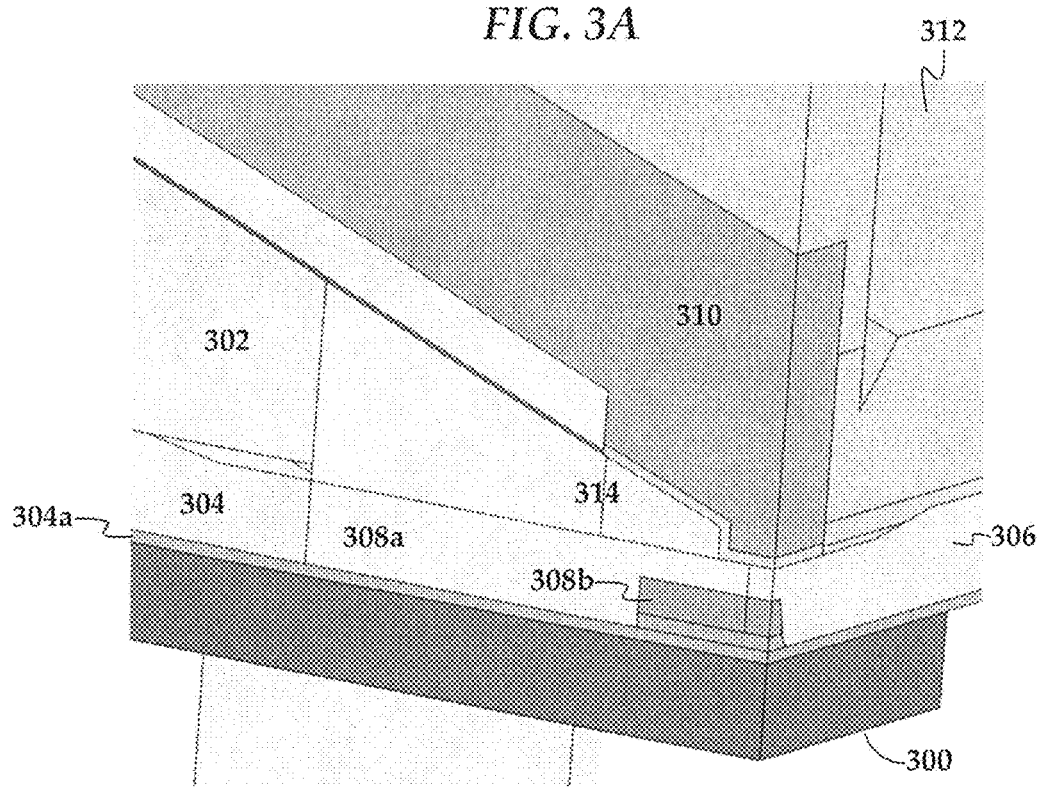
FIG. 3B is a partial perspective view of a partially wrapped near-field transducer according to embodiments discussed herein.
Figure 3C:
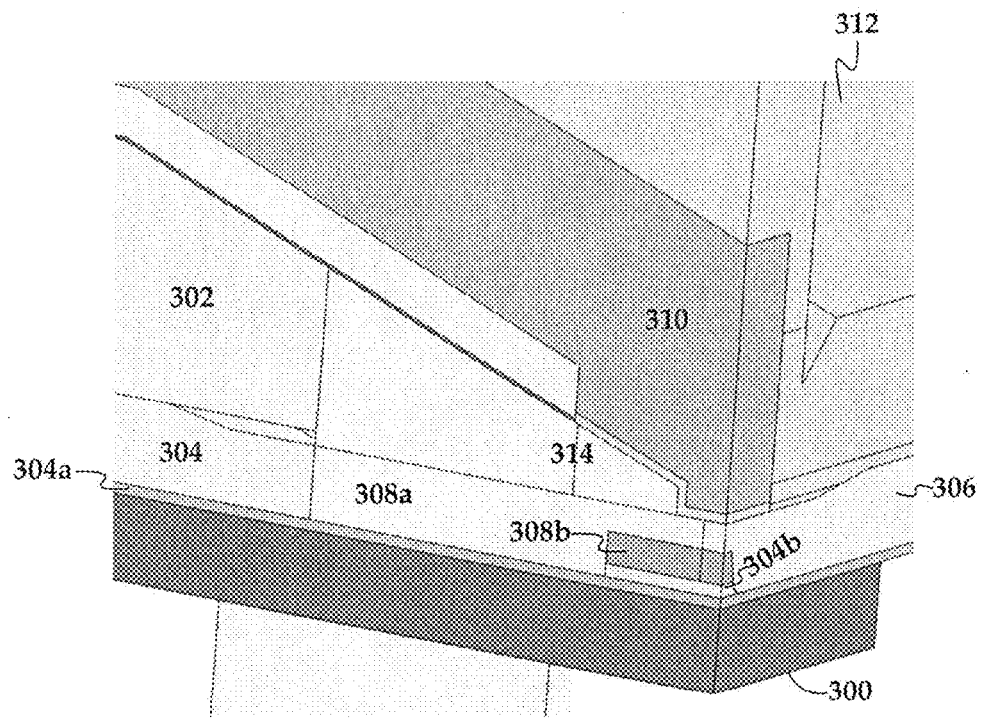
FIG. 3C is a partial perspective view of a partially wrapped near-field transducer according to embodiments discussed herein.
Figure 3D:
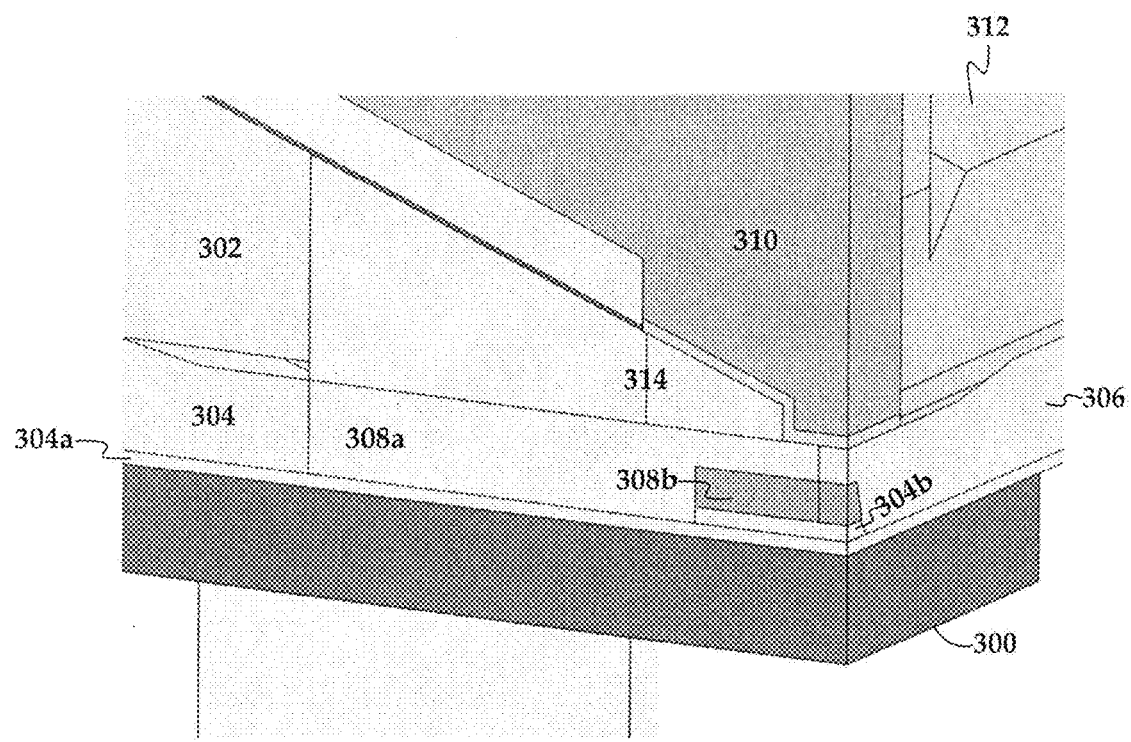
FIG. 3D is a partial perspective view of a fully wrapped near-field transducer according to embodiments discussed herein.

In further embodiments, more surface area of the NFT is wrapped in a lower refractive index material than the baseline configuration shown in FIG. 3A. FIG. 3B illustrates a configuration referred to herein as Design I, where, in addition to the top cladding 302, the side cladding 304 and the NPS layer 306 are replaced with silica. In FIG. 3B, the CNS layer 304a remains as alumina. FIG. 3C illustrates a configuration referred to Design II, where a bi-layer structure is shown for the CNS layer. While the CNS layer 304a remains as alumina, the portion between the peg 308b and the bottom surface of the NFT, layer 304b, is replaced with silica. Thus, in FIG. 3C, the top cladding 302, the side cladding 304, the NPS layer 306, and layer 304b are comprised of silica. FIG. 3D illustrates a configuration referred to as Design III, which shows the NFT fully wrapped in silica. Here, the top cladding 302, the side cladding 304, the CNS layer 304a, layer 304b, and the NPS layer 306 are comprised of silica.

The increased amount of lower index material (e.g., silica) reduces the temperature of the NFT at both the peg 308b and the enlarged portion 308a. Table 1 below shows the respective temperature differences for the different designs, as compared with the baseline configuration.

TABLE 1

| Configuration | Peg ΔT (° C.) | Disk ΔT (° C.) |
|---|---|---|
| Design I | −32 | −18 |
| Design II | −42 | −22 |
| Design III | −54 | −27 |

Table 1 shows the temperature change for components of the respective dielectric configurations with respect to reference temperatures recorded for the baseline configuration of FIG. 3A. For each component, peg 308b and enlarged portion 308a (e.g., disk), the temperature reduced further with each increase in the amount of lower index material present proximate the NFT. The lower refractive index material provided a 30-50° C. decrease in NFT temperature at the peg, and a 10-30° C. decrease in temperature at the enlarged portion 308a.

In addition to the amount of low index dielectric present proximate the NFT, the exposed length of the peg can also influence the NFT temperature. The exposed peg length is described herein by the break point, which is the position on the peg that is in contact with the enlarged portion of the NFT nearest to the ABS. For example, a break point of 30 nm indicates that 30 nm of the peg extends outward from the enlarged portion toward the ABS. In Table 2, the respective temperature differences for the different designs are shown for NFT configurations having different break points.

TABLE 2

| Configuration | Break Point (nm) | Peg ΔT (° C.) | Disk ΔT (° C.) |
|---|---|---|---|
| Design I | 35 | −32 | −18 |
| Design II | 35 | −42 | −22 |
| Design III | 35 | −54 | −27 |
| Design I | 40 | −39 | −22 |
| Design II | 40 | −50 | −27 |
| Design III | 40 | −65 | −32 |

Table 2 shows the temperature change for components of the respective dielectric configurations with respect to reference temperatures recorded for the baseline configuration. As can be seen, the first three lines of Table 2 correspond to the data of Table 1 indicating that the configurations tested in Table 1 each had a break point of 35 nm. However, as the break point is increased, e.g., by 5 nm, the temperature reductions also increased. Again, for each component, peg 308b and enlarged portion 308a (e.g., disc), the temperature reduced further with each increase in the amount of lower index material present proximate the NFT and increase in the break point (e.g., exposed peg length). Therefore, the lower refractive index material could reduce the break point sensitivity of the NFT.

Figure 4:
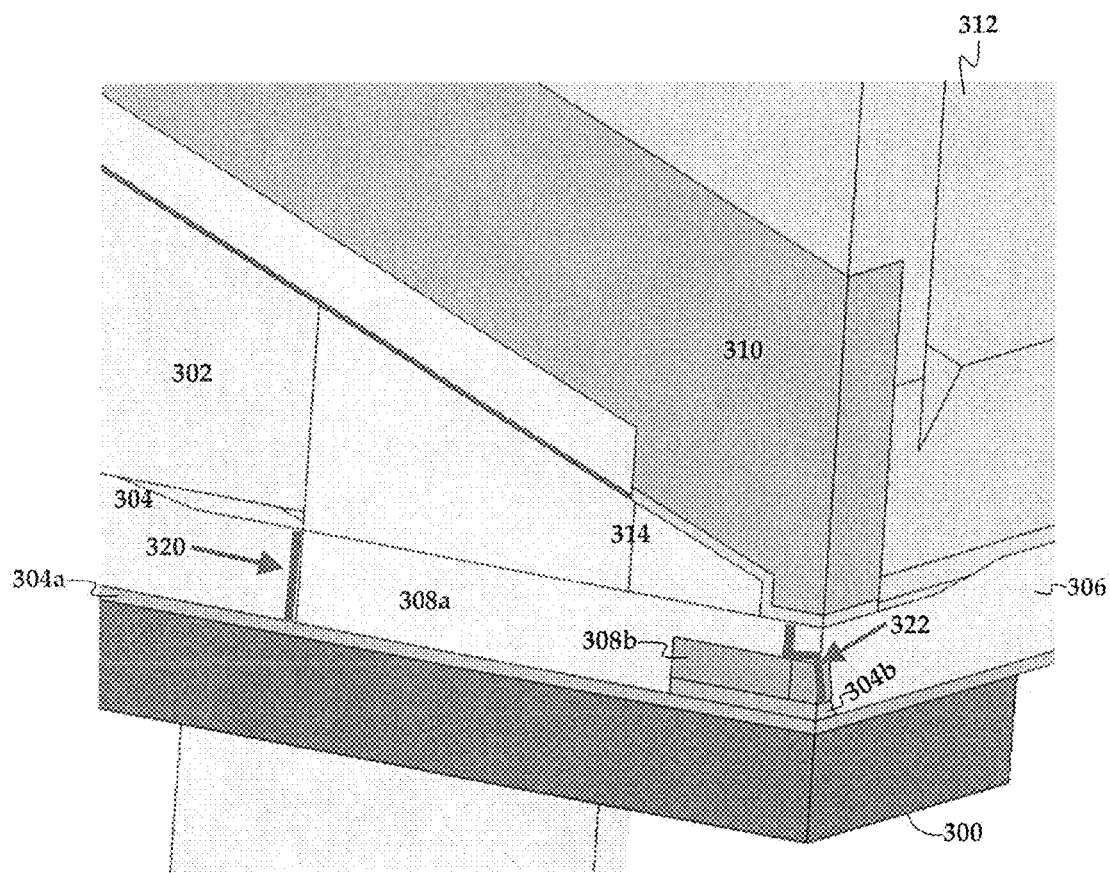
FIG. 4 is a partial perspective view of the slider of FIG. 3B showing adhesion layers according to embodiments discussed herein.

While silica's lower refractive index allows for temperature reduction in the NFT, silica and some soft plasmonic materials such as gold do not adhere well to each other. If the NFT and surrounding dielectric lack structural integrity, the NFT can move or be prone to damage, which can cause the entire magnetic recording device to fail during processing or operation. To improve the structural integrity of the NFT, an adhesion layer is disposed between the enlarged portion and peg of the NFT and the silica dielectric portions. As shown in FIG. 4, the configuration of FIG. 3B includes an adhesion layer 320 along the enlarged portion 308a surface opposite the ABS as well as an adhesion layer 322 between the NPS layer 306 and the enlarged portion 308a and the peg 308b. There is also an adhesion layer between the top cladding 302 and the heatsink 314 when the top cladding 302 comprises silica. For the configurations of FIGS. 3C-D, additional adhesion layers are positioned at the interface of the silica and the NFT. For example, in FIG. 3C, an adhesion layer would be disposed along the surface of the peg 308b and the ABS-facing surface of the enlarged portion 308a. In FIG. 3D, an additional adhesion layer would be disposed between the NPS layer 304a and the surface of the enlarged portion 308a opposing the heatsink 314. While the adhesion layers can comprise a variety of materials, an alumina layer having a thickness of about 2 to 10 nm can effectively adhere the NFT to the surrounding silica dielectric.

Figure 5A:
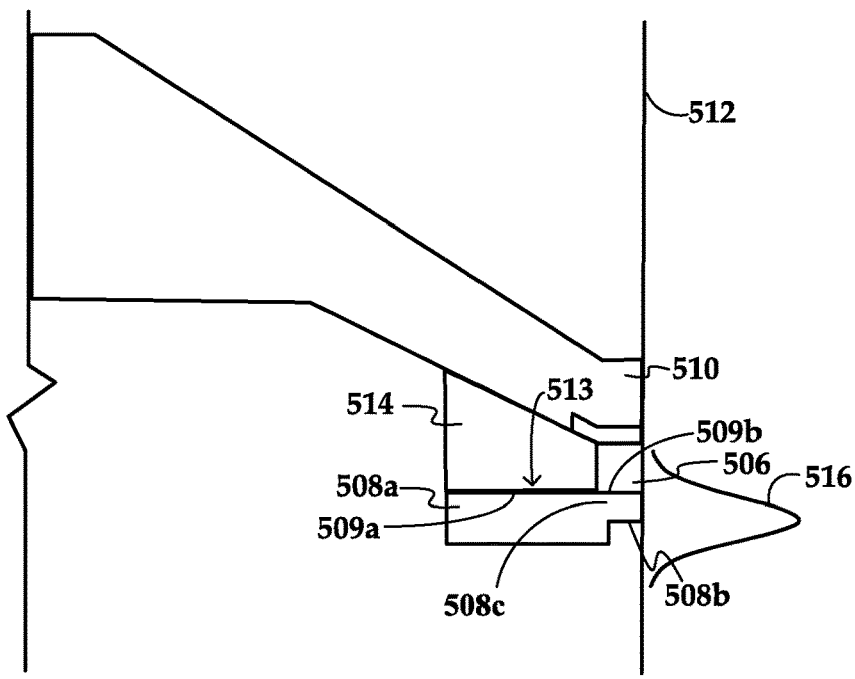
FIG. 5A is a cross-sectional view of an example thermal gradient produced by a non-recessed near-field transducer configuration according to embodiments discussed herein.
Figure 5B:
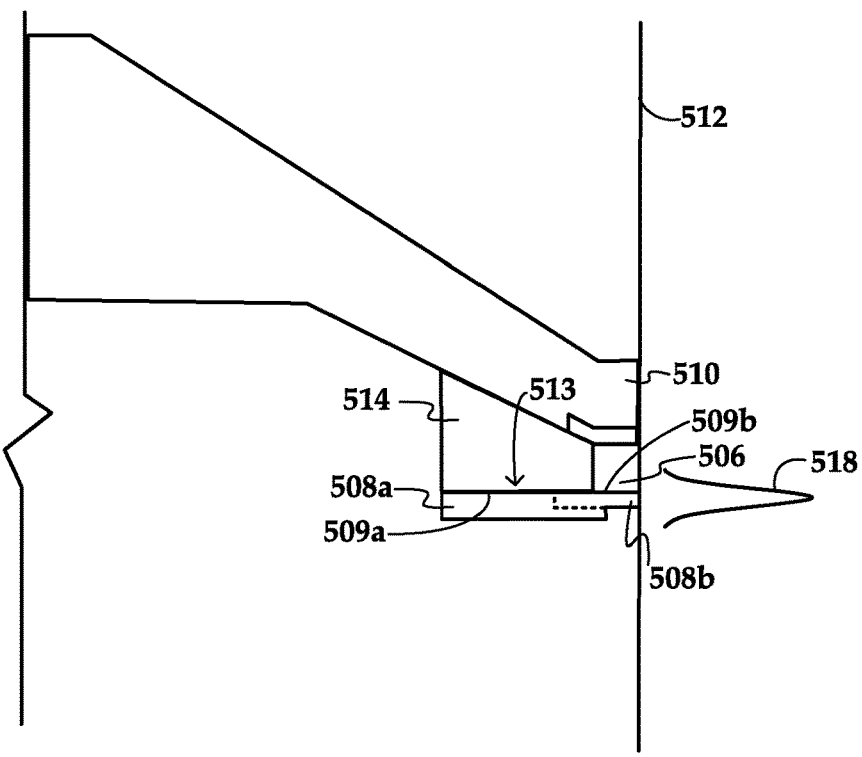
FIG. 5B is a cross-sectional view of an example thermal gradient produced by a recessed near-field transducer configuration according to embodiments discussed herein.

Incorporating an increased amount of low refractive index material proximate the NFT reduces the NFT temperature. In certain embodiments, the NFT design can further increase the amount of low refractive index material proximate the NFT to further reduce the NFT temperature. FIGS. 5A-B illustrate the thermal gradient generated by various NFT designs. Both figures show an NFT proximate a write pole 510 at a slider ABS 512. The NFT includes a heatsink 514, an enlarged portion 508a, and a peg 508b. An NPS layer 506 is located between the peg 508b and the write pole 510. A first surface 509b of the peg 508b is substantially coplanar with a first surface 509a of the enlarged portion 508a and the first surface 509a of the enlarged portion 508a shares an interface 513 with the heatsink 514. In FIG. 5A, similar to the NFT configurations shown in FIGS. 3A-D, the enlarged portion 508a includes an overhang section 508c that extends along a surface of the peg 508b proximate the NPS layer 506. The overhang section 508c can have a thickness of up to, or more than, about 20 nm. This configuration is referred to as a non-recessed design. In FIG. 5B, the overhang section 508c is removed such that the peg 508b has an increased interface with the NPS layer 506. This is referred to as a recessed design. While the enlarged portion is shown as being larger in FIG. 5A as compared with FIG. 5B, this is to highlight the addition of the overhang section 508c. The figures are not to scale, and the remainder of the enlarged portion 508a can be the same size, or vary, between a non-recessed and recessed NFT design.

As shown by the arrow in FIG. 5A, heat generated by the peg 508b and/or reflected from the recording medium, flows through the NFT toward the heatsink 514. In FIG. 5A, heat travels through the peg 508b, into the overhang section 508c, and then into the heatsink 514. This path causes the thermal gradient 516 to bloom or widen along the ABS. This can result in a larger thermal spot on the recording medium and/or errors in reading or writing to the medium. Thus, a sharper, or more focused, thermal gradient provides for more efficient writing/reading operations. As shown by the arrow in FIG. 5B, reduction, or removal, of the overhang section 508c sharpens the thermal gradient 518. The increased amount of low index dielectric in the NPS layer 506 helps direct the heat path through the peg 508b toward the heatsink 514. The recessed design of FIG. 5B has a more focused thermal gradient 518 as compared with the thermal gradient 516 of FIG. 5A, and would be expected to further reduce the operating temperature of the NFT.

Figure 6A:
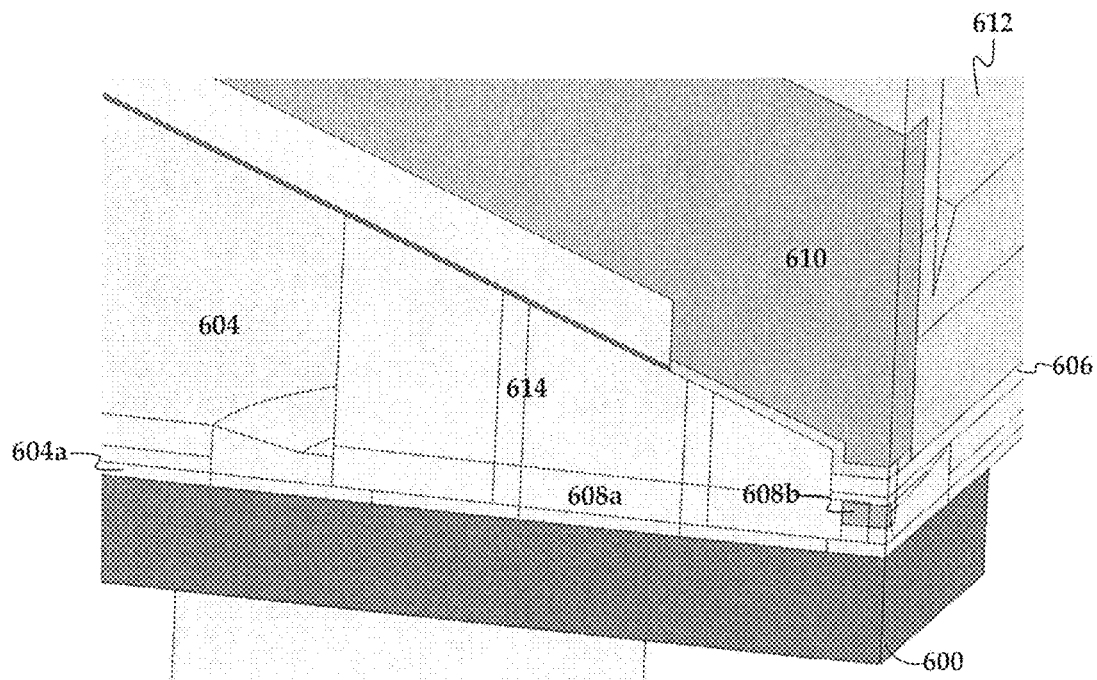
FIG. 6A is a partial perspective view of a recessed, fully wrapped near-field transducer according to embodiments discussed herein.
Figure 6B:
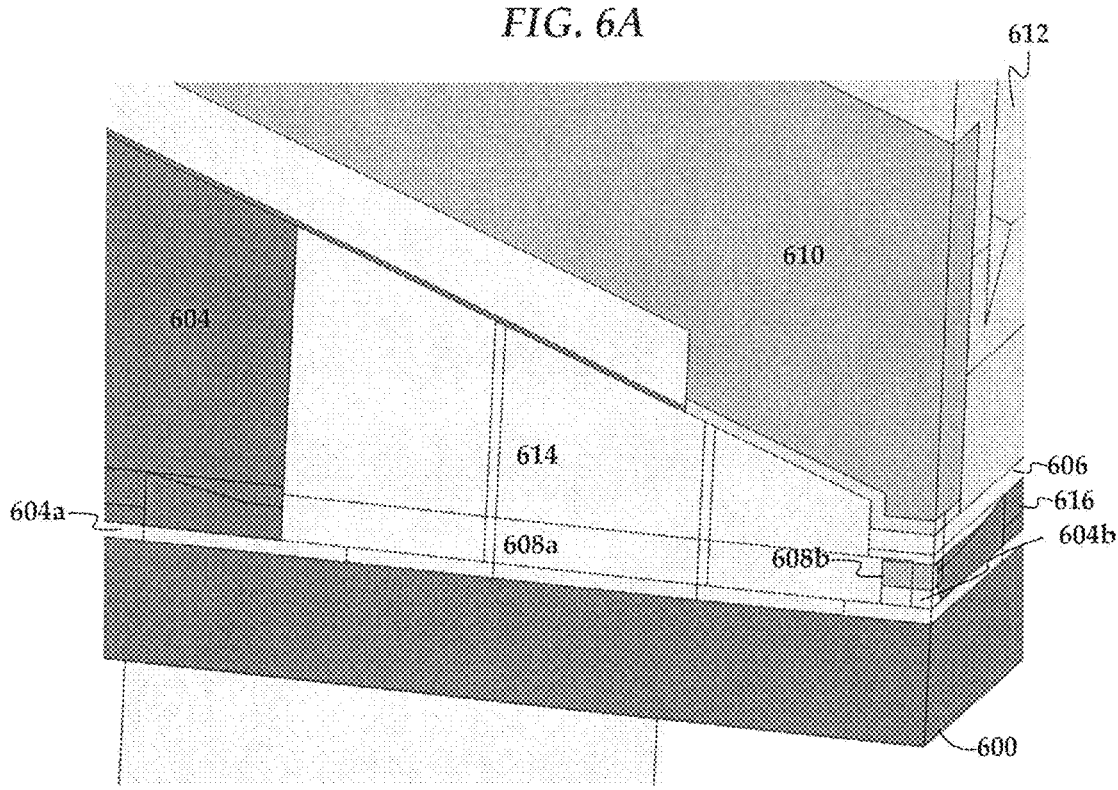
FIG. 6B is a partial perspective view of a recessed, partially wrapped near-field transducer according to embodiments discussed herein.

FIGS. 6A-B illustrate perspective cross-sectional views of a HAMR slider having a recessed NFT design with different configurations of low index dielectric material. In FIG. 6A, a recessed NFT configuration is shown where an NFT is positioned between a write pole 610 and a waveguide core 600. The NFT comprises an enlarged portion 608a (e.g., a disc), a peg 608b, and a heatsink 614. The peg 608b extends from the enlarged portion 608a toward the media-facing, or air-bearing, surface (ABS) 612. Portions of the waveguide cladding 604 are shown proximate an NFT surface opposite the ABS 612. The waveguide cladding 604 includes a layer 604a that is disposed between the NFT and the waveguide core 600, and the layer 604a can be referred to as the core to NFT spacing (CNS) layer. The CNS layer can be about 10 to 60 nm, about 15 to 30 nm, or about 15-25 nm. Also, the layer 606 located between the peg 608b and the write pole 610 is referred to herein as the NFT to pole spacing (NPS) layer. While the NFT is generally surrounded by dielectric material, the respective refractive indices of those materials in combination with the NFT materials affects the temperature of the NFT.

The NFT design of FIG. 6A is a fully-wrapped recessed NFT configuration and is referred to as Design IV. The term "fully-wrapped" refers to the NFT being surrounded by low refractive index material (e.g., n≤1.5). For example, the waveguide cladding 604, CNS layer 604a, and NPS 606 are all comprised of low refractive index material such as silica. As in the designs discussed above, the NFT heatsink 612 and enlarged portion 608a are comprised of a soft plasmonic material such as gold, and the peg 608b is comprised of a refractory metal (e.g., Rh, Ir, Pd, Pt, and alloys thereof). In certain embodiments, the enlarged portion 608a comprises gold, and the peg 608b comprises rhodium.

As discussed above, different designs can involve varying amounts of low index dielectric material proximate the NFT. In FIG. 6B, a configuration referred to herein as Design V, a combination of dielectric materials is used proximate the NFT. Here, the CNS layer 604a and 604b, along with the NPS layer 606 comprise a low index dielectric material (e.g., n≤1.5). However, the waveguide cladding 604 and the layer 616 between the CNS layer 604a and NPS layer 606 comprise a higher refractive index dielectric such as alumina. This provides a partially-wrapped, or sandwich configuration, of low-index dielectric material. In alternative embodiments, the recessed NFT configuration can be implemented with varying amounts of low index dielectric material proximate the NFT, including configurations similar to the designs described above in connection with FIGS. 3A-C. Also, the recessed NFT configurations can include adhesion layers between any and/or all low index refractive material (e.g., silica) layers adjacent the NFT (e.g., adjacent gold and/or gold alloys and/or Rh).

As discussed above, the increased amount of lower index material (e.g., silica) reduces the temperature of the NFT at the peg 308b. While the dielectric wrap may be silica as discussed above, materials with a lower refractive index than alumina, or even silica, can further reduce the NFT temperature. For example, dielectric material having a refractive index of about 1.40 (e.g., MgF$_2$) or lower can further reduce the peg temperature of the NFT. Table 3 below shows the respective NFT peg temperature differences for different designs and materials.

TABLE 3

| Configuration | Dielectric Material | Peg ΔT (° C.) |
|---|---|---|
| FIG. 5B | silica | −37.4 |
| Design IV | silica | −47 |
| Design V | silica | −34 |
| Design IV | n = 1.40 | −63 |

Table 3 shows the peg temperature change of the respective dielectric configurations and dielectric materials with respect to a reference temperature recorded for the baseline configuration of FIG. 5B having Al$_2$O$_3$ (alumina) as the dielectric. Again, for each design, the temperature of the NFT peg 608b reduced further with increased amounts of lower index material present proximate the NFT. The fully-wrapped design of FIG. 6A provided a greater reduction in temperature as compared with the sandwiched design of FIG. 6B. In addition, the lower index material (n=1.40) provided an even further temperature reduction for the design of FIG. 6A than silica in the same design.

Figure 7A:
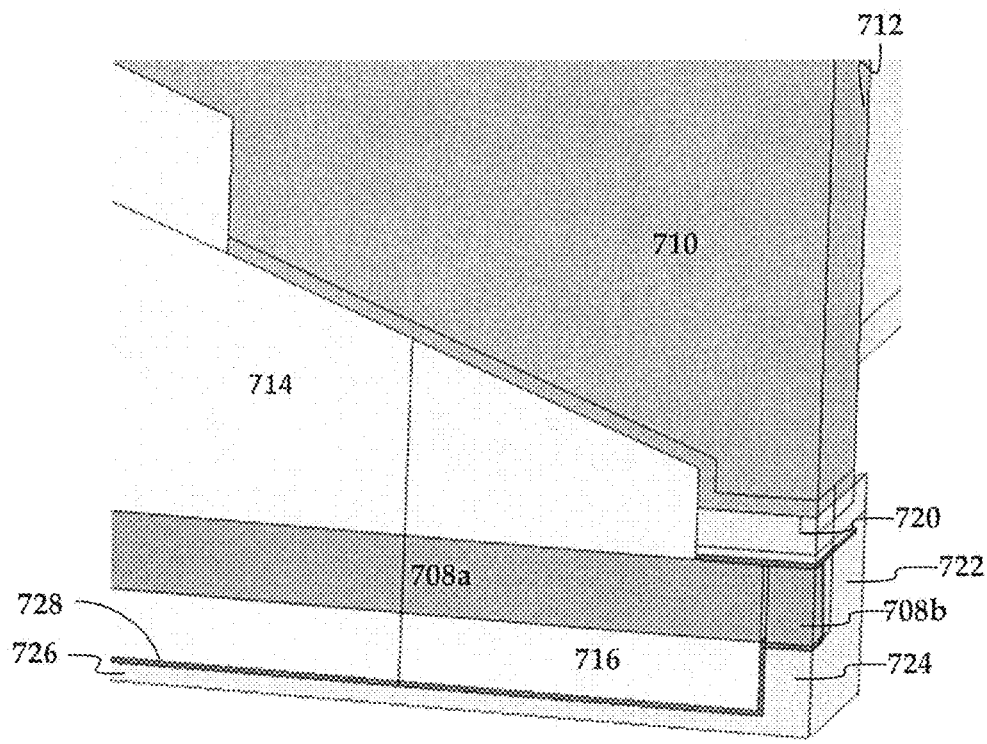
FIG. 7A is a partial perspective view of a recessed, fully wrapped near-field transducer including a sunken disc according to embodiments discussed herein.
Figure 7B:
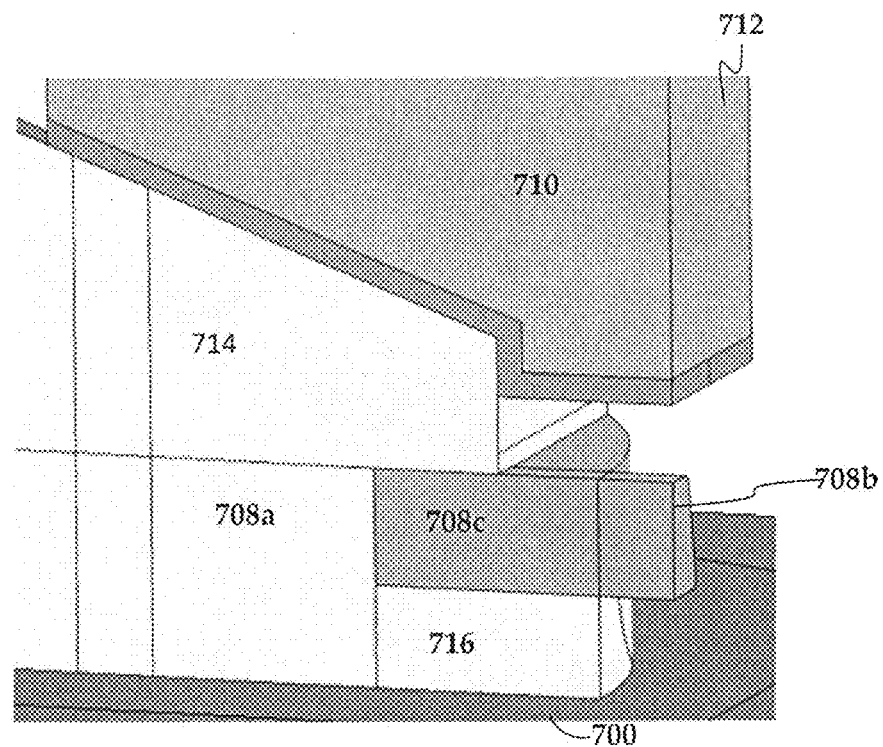
FIG. 7B is a partial perspective view of a recessed, partially wrapped near-field transducer including a sunken disc according to embodiments discussed herein.

Increasing the amount of lower index material present proximate the NFT also reduces the peg temperature of other NFT designs. FIGS. 7A-B illustrate perspective cross-sectional views of a HAMR slider having a sunken disc NFT configuration. The sunken disc 716 comprises NFT plasmonic material (e.g., gold) positioned below the peg 708b. FIG. 7A shows a "full anchor" design where the peg is part of a contiguous layer of the same material forming the peg 708b and the enlarged portion 708a of the NFT. FIG. 7B shows an alternative, "stitched anchor" design where the peg 708b and only a portion of the enlarged portion 708c comprise the same material (e.g., the front portion closest to the ABS), and the remaining portion of the enlarged portion 708b comprises a different material (e.g., the same material as the sunken disc 716 and/or the heatsink 714). The heatsink 714 is positioned in contact with the enlarged portion of the NFT 708a, can comprise a material different from that of the NFT enlarged region 708a (i.e., in the full anchor" design), and is recessed from the media-facing, or air-bearing, surface (ABS) 712. Similar to the configuration of FIG. 6A, the NFT 708a-b is positioned between a write pole 710 and a waveguide core 700. The peg 708b extends from the enlarged portion 708a toward the ABS 712. While not shown, the sunken disc configurations of FIGS. 7A-B include a waveguide and cladding as illustrated in the previous designs and configurations. While the NFT is generally surrounded by dielectric material, the respective refractive indices of those materials in combination with the NFT materials affects the temperature of the NFT in a sunken disc configuration.

The NFT design of FIG. 7A is also referred to herein as Design VI. As shown in FIG. 7A, the design can be a fully-wrapped NFT configuration. The term "fully-wrapped" refers to the NFT being surrounded by low refractive index material (e.g., n≤1.5). Here, being surrounded refers to low refractive index material in at least four areas: 1) between the peg and the write pole, NPS 720, 2) underneath the sunken disc, CDS 726, 3) underneath the peg and above the CDS, CNS 724, and 4) at the sides of the peg 708*b* and enlarged region 708*a*, 722. In addition, the waveguide cladding (not shown but to the left of the heatsink 714 as shown in previous designs), can also be comprised of low refractive index material such as silica. As in the designs discussed above, the NFT heatsink 712, sunken disc 716, and, in certain embodiments, a portion of the enlarged portion 708*a* are comprised of a soft plasmonic material such as gold, and the peg 708*b* (and/or enlarged portions 708*b* and/or *c*) is comprised of a refractory metal (e.g., Rh, Ir, Pd, Pt, and alloys thereof). In certain embodiments, the enlarged portion 708*a* comprises gold, and the remainder of the NFT 708*c* and peg 708*b* comprise rhodium, and in other embodiments the enlarged portion 708*a* and the peg 708*b* comprise rhodium.

As discussed above, an NFT design can involve varying amounts of low index dielectric material proximate the NFT. For example, a combination of dielectric materials can be used proximate the NFT. These various combinations are shown below in Table 4 for Design VI of FIG. 7A. While designs a, d, and e use the same dielectric material to surround the NFT, designs b, c, and f provide partially-wrapped, or sandwich configurations, of low-index dielectric material. Also, the NFT configuration of Design VI can include adhesion layers 728 between any and/or all low index refractive material (e.g., silica) layers adjacent the NFT (e.g., adjacent gold and/or gold alloys and/or Rh). Again, the increased amount of lower index material (e.g., silica) reduces the temperature of the NFT at the peg 708*b*. Table 4 below shows the respective NFT peg temperature differences for varying combinations of dielectric materials for Design VI.

TABLE 4

| Config-uration | CDS | CNS | NPS | Sides | Liner AlO (3 nm) | ATE | Peg ΔT (K) | Ieff (mA) |
|---|---|---|---|---|---|---|---|---|
| Design VI a | AlO | AlO | AlO | AlO | No | 52.9% | 330K | 5.75 |
| Design VI b | AlO | AlO | SiO$_2$ | SiO$_2$ | Yes | 52.5% | −30 | 5.0 |
| Design VI c | AlO | SiO$_2$ | SiO$_2$ | SiO$_2$ | Yes | 52.5% | −38 | 4.9 |
| Design VI d | SiO$_2$ | SiO$_2$ | SiO$_2$ | SiO$_2$ | Yes | 52.5% | −48 | 4.8 |
| Design VI e | SiO$_2$ | SiO$_2$ | SiO$_2$ | SiO$_2$ | No | 52.5% | −58 | 4.7 |
| Design VI f | SiO$_2$ | AlO | SiO$_2$ | SiO$_2$ | Yes | 52.5% | −40 | 4.9 |

Table 4 shows the peg temperature change of the respective dielectric configurations of materials with respect to a reference temperature recorded for the baseline configuration of Design VI a having alumina as the dielectric. Again, for each design, the temperature of the NFT peg 708*b* reduced further with increased amounts of lower index material present proximate the NFT. The fully-wrapped design of FIG. 7A (Designs VI d and e) provided a greater reduction in temperature as compared with the sandwiched designs of Designs VI b, c, and f. The absence of an adhesion liner between the low index refractive material and the plasmonic material of the NFT further reduced the peg temperature as shown in the comparison of Design VI d and Design VI e. Each of the designs reported in Table 4 maintained a down track and cross track temperature gradient of 8.3 K/nm, and each of the designs including silica (Design VI b-e) maintained an adjacent track erasure (ATE) of 52.5%. Notably, as the peg temperature decreases, so does the effective current required to power the laser diode. This increases the efficiency of the slider while subsequently improving the reliability and operational life.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. An apparatus, comprising:
   a write pole;
   a waveguide core;
   a near-field transducer (NFT) positioned between the write pole and the waveguide core, the NFT comprising a heatsink portion, an enlarged portion, and a peg comprising a refractory metal and extending from the enlarged portion toward a media-facing surface, wherein a first surface of the peg is substantially coplanar with a first surface of the enlarged portion and the first surface of the enlarged portion shares an interface with the heatsink portion;
   a first dielectric layer positioned between the peg and the write pole;
   a first adhesion layer positioned between the peg and the first dielectric layer;
   a second dielectric layer disposed on an entire surface of the NFT opposing the media-facing surface; and
   a second adhesion layer positioned between the NFT and the second dielectric layer.

2. The apparatus of claim 1, wherein the first dielectric layer has a refractive index less than 1.5.

3. The apparatus of claim 1, wherein the first and second dielectric layers have a refractive index less than 1.5.

4. The apparatus of claim 1, wherein at least one of the dielectric layers comprises SiO$_2$.

5. The apparatus of claim 1, wherein the first and second dielectric layers comprise SiO$_2$.

6. The apparatus of claim 1, further comprising a third dielectric layer positioned between the NFT and the waveguide core.

7. The apparatus of claim 6, wherein the third dielectric layer has a thickness of about 10 to 60 nm.

8. The apparatus of claim 6, wherein the first, second, and third dielectric layers comprise the same material.

9. The apparatus of claim 1, wherein the NFT comprises a sunken disc.

10. The apparatus of claim 1, wherein the peg comprises rhodium.

11. An apparatus, comprising:
    a write pole;
    a waveguide core;

a near-field transducer (NFT) positioned between the write pole and the waveguide core, the NFT comprising a heatsink portion, an enlarged portion, and a peg comprising a refractory metal and extending from the enlarged portion toward a media-facing surface, wherein a first surface of the peg is substantially coplanar with a first surface of the enlarged portion and the first surface of the enlarged portion shares an interface with the heatsink portion;

a first dielectric layer positioned between the NFT and the write pole; and a second dielectric layer positioned between the waveguide core and the enlarged portion and peg of the NFT, wherein at least the second dielectric layer has a refractive index less than 1.5.

12. The apparatus of claim 11, wherein the first and second dielectric layers have a refractive index less than 1.5.

13. The apparatus of claim 11, wherein the first and second dielectric layers comprise $SiO_2$.

14. The apparatus of claim 11, wherein the second dielectric layer has a thickness of about 10 to 60 nm.

15. An apparatus, comprising:
a write pole;
a waveguide core;
a near-field transducer (NFT) positioned between the write pole and the waveguide core, the NFT comprising a heatsink portion, an enlarged portion, and a peg comprising a refractory metal and extending from the enlarged portion toward a media-facing surface, wherein a first surface of the peg is substantially coplanar with a first surface of the enlarged portion and the first surface of the enlarged portion shares an interface with the heatsink portion;

a first dielectric layer positioned between the peg and the write pole; and a second dielectric layer positioned between the NFT and the waveguide core, wherein the second dielectric layer comprises a bi-layer structure having a first dielectric material proximate the peg and a second dielectric material proximate the waveguide core, wherein at least the first dielectric material has a refractive index less than 1.5.

16. The apparatus of claim 15, wherein the first dielectric layer comprises the first dielectric material.

17. The apparatus of claim 15, wherein the first dielectric material and the second dielectric material are different.

18. The apparatus of claim 15, wherein the NFT comprises a sunken disc and the second dielectric material is positioned between the sunken disc and the waveguide core.

19. The apparatus of claim 15, wherein the peg comprises rhodium.

20. The apparatus of claim 15, wherein the first dielectric material is $SiO_2$ and the second dielectric material is alumina.

* * * * *